United States Patent [19]
Ritter et al.

[11] Patent Number: 6,136,453
[45] Date of Patent: Oct. 24, 2000

[54] ROUGHENED BOND COAT FOR A THERMAL BARRIER COATING SYSTEM AND METHOD FOR PRODUCING

[75] Inventors: Ann Melinda Ritter; Melvin Robert Jackson, both of Niskayuna; Yuk-Chiu Lau, Ballston Lake, all of N.Y.

[73] Assignee: General Electric Company, Schenectady, N.Y.

[21] Appl. No.: 09/199,063

[22] Filed: Nov. 24, 1998

[51] Int. Cl.[7] .................................. C23C 4/06; C23C 4/12
[52] U.S. Cl. .................... 428/612; 428/652; 428/655; 428/680; 428/687; 428/937; 427/456
[58] Field of Search ..................................... 428/600, 612, 428/652, 655, 679, 680, 937, 687; 427/456; 419/819; 75/255

[56] References Cited

U.S. PATENT DOCUMENTS

| | | |
|---|---|---|
| 4,173,685 | 11/1979 | Weatherly . |
| 5,236,745 | 8/1993 | Gupta et al. . |
| 5,403,669 | 4/1995 | Gupta et al. . |
| 5,498,484 | 3/1996 | Duderstadt . |
| 5,817,372 | 10/1998 | Zheng . |
| 5,863,668 | 1/1999 | Brindley et al. . |

*Primary Examiner*—Deborah Jones
*Assistant Examiner*—Jason Savage
*Attorney, Agent, or Firm*—Ernest G. Cusick; Noreen C. Johnson

[57] ABSTRACT

A bond coat and method of forming a bond coat for a thermal barrier coating system are set forth. The bond coat is a roughened bond coat and comprises a layer possessing an uneven, undulated, and irregular surface. The layer is formed of a metal powder mixture disposed on a substrate, such as a turbine component, by high velocity oxygen fuel spraying. The metal powder mixture comprises at least one of a first powder having a first melting point and a second powder having a second melting point that is higher than the first melting point. The bond coat's uneven, undulated, and irregular surface enhances prevention of de-bonding of elements in a thermal barrier coating system.

23 Claims, 3 Drawing Sheets

ROUGHENED BOND COAT FOR A THERMAL BARRIER COATING SYSTEM AND METHOD FOR PRODUCING

BACKGROUND OF THE INVENTION

The invention relates to bond coats. In particular, the invention relates to roughened bond coats for thermal barrier coating systems.

Thermal barrier coating systems are used in hot-section components in turbine and turbine components, for example components of jet engines and gas turbines. The thermal barrier coating system insulates the turbines from high temperatures during thermal cycling. Thermal barrier coating systems include a thermal barrier coating (TBC) disposed on a bond coat, which in turn is disposed on a substrate. The thermal barrier coating normally comprises zirconia, for example such as one of a stabilized zirconia and a partially-stabilized zirconia (PSZ). The bond coat typically comprises an oxidation-resistant metallic layer disposed between the TBC and substrate (turbine component). The TBC is adhered to the bond coat typically by mechanical interlocking, so the bond coat provides oxidation resistant to the substrate and a relatively rough surface. The bond coat surface generally has Ra (Arithmetic Average Roughness (Ra) as determined from ANSI/ASME Standard B461-1985) values over about 350 mainly by mechanical interlocking. So the function of the bond coat is to provide oxidation resistant to the substrate and a relatively rough surface, preferably with Ra values over about 350 microinches, for the TBC to adhere to the substrate. Thus, the TBC is disposed over the turbine component can provide thermal insulation.

FIG. 1 is a schematic representation of a known thermal barrier coating system 1. A substrate 10 comprises an underlying part of a component, for example a turbine component. A bond coat 12 is disposed on the substrate 10. The bond coat is disposed on the substrate 10 by any appropriate method, for example, but not limited to, thermal spray processes, such as vacuum plasma spray (VPS), air plasma spray (APS) and hyper-velocity oxy-fuel (HVOF) spray processes.

The structure and roughness of bond coat surface 13 are dependent on the spray process. Bond coats deposited by a VPS process are typically dense and free of oxides. Therefore, VPS-applied bond coats provide protection at high temperatures against oxidation. The VPS application process disposes fine powders, and thus, VPS-applied bond coats are typically dense, for example having a density greater than about 90% of its theoretical density, but have relatively smooth surfaces. Consequently, a TBC does not adhere well to a VPS bond coat.

An air plasma spray (APS) process produces rough bond coats because of large powders used in APS. The large powders possess a relatively high heat capacity; however, the APS-applied bond coats contain high amounts of oxides. Also, APS-applied bond coats possess a relatively low porosity due to the oxidation environment and low momentum of the powders. Although APS-applied bond coats provide better TBC adhesion due to their roughness, they are more prone to oxidation because of their relatively high oxide levels and relatively low porosity.

Bond coats deposited by HVOF are sensitive to particle size distributions. Dense and oxide-free bond coats can be deposited by HVOF using very lean conditions (low oxygen amounts) and finer particles, for example particles with a size about −325+10 µm. The surface roughness of HVOF-applied bond coats is relatively smooth. Rough bond coats can be deposited by HVOF using coarser powders, for example particles with a size about −230+325, however a low HVOF flame temperature is needed. The low flame temperatures results in the bond coat comprising un-melted powders, therefore the coating is porous and less dense.

A TBC 14 is disposed on the bond coat 12 and forms a surface 15 against the surface 13. The TBC 14 is disposed on the bond coat 12 by any appropriate process to adhere (bond) to the bond coat. The TBC surface 15 and bond coat surface 13 define an interfacial area 16 at their adjoining surfaces.

Effectiveness of a thermal barrier coating system during thermal cycling is compromised by de-bonding of the TBC and bond coat, for example at the TBC and bond coat interfacial area. De-bonding can be caused by a poor TBC and bond coat adhesion or lack of accommodation of thermal expansion mismatch between the TBC, and bond coat. The lack of adhesion is characteristic of smooth adjoining surfaces where total surface areas are minimal. The thermal expansion mismatch between the TBC and bond coat results from different coefficients of thermal expansion of the materials used for these features. If the different coefficients of thermal expansion of the adhered elements are large, one element expands much more than the other, and separation and de-bonding occur at the interfacial areas. De-bonding of the TBC and bond coat is undesirable as the insulation effect of the thermal barrier coating system will be lost at TBC separation.

Therefore, it is desirable to use a very dense and rough bond coat that provides oxidation resistance and promotes enhanced adhesion between the TBC and the bond coat. The oxidation resistance and enhanced adhesion assist in preventing de-bonding. The adhesion between the TBC and bond coat can be increased by increasing an area at an interfacial area mating surface of adhered elements. Increasing a roughness of the bond coat provides an increased area and enhanced mechanical interlocking between the bond coat and TBC. Increasing a bond coat's roughness also provides an increased interfacial surface area for accommodation of any thermal mismatch, with respect to non-roughened bond coats.

SUMMARY OF THE INVENTION

The invention overcomes the above noted deficiencies of known thermal barrier coating systems. The invention sets forth a method of forming a dense bond coat. The method comprises providing a metal powder mixture and disposing the metal powder mixture onto a substrate. The disposing is conducted by a thermal spray process such as high velocity oxygen fuel spraying, to form a dense bond coat possessing an uneven, undulated, and irregular surface.

A dense (for example at least about 95% its theoretical density), bond coat is also provided by the invention, where the bond coat comprises a roughened layer possessing an uneven, undulated, and irregular surface. The layer is formed of a metal powder mixture disposed on a substrate by high velocity oxygen fuel spraying. The metal powder mixture comprises a first powder having a first melting point and a second powder having a second melting point that is higher than the first melting point.

Another embodiment of the invention provides a method of forming a thermal barrier coating system. The thermal barrier coating system comprises a thermal barrier system and a dense (for example at least about 95% its theoretical density), roughened bond coat disposed on a substrate, where the roughened bond coat possesses an uneven, undulated, and irregular surface. The method comprises disposing a bond coat on a substrate and disposing a thermal barrier coating on the bond coat. The bond coat is disposed by providing a metal powder mixture and disposing the metal powder mixture onto the substrate by high velocity oxygen fuel spraying.

Yet another embodiment of the invention provides a thermal barrier coating system. A thermal barrier coating system comprises a dense (for example at least about 95% its theoretical density), roughened bond coat disposed on a substrate and a thermal barrier coating disposed on the roughened bond coat. The dense roughened bond coat comprises a layer possessing an uneven, undulated, and irregular surface. The layer is formed of a metal powder mixture disposed on a substrate by high velocity oxygen fuel spraying. The metal powder mixture comprises a first powder having a first melting point and a second powder having a second melting point that is higher than the first melting point. The TBC is then applied by a spraying process, such as air plasma spray (APS).

These and other aspects, advantages and salient features of the invention will become apparent from the following detailed description, which, when taken in conjunction with the annexed drawings, where like parts are designated by like reference characters throughout the drawings, disclose embodiments of the invention.

DETAILED DESCRIPTION OF THE INVENTION

Roughened bond coats enhance adhesion between a thermal barrier coating (TBC) and a bond coat in a thermal barrier coating system. Roughened bond coats prevent de-bonding and separation between the TBC and bond coat of the thermal barrier coating system. A roughened bond coat increases interfacial mating surface areas of adhered elements, enhances mechanical interlocking between the bond coat and TBC, and provides for accommodation of any thermal mismatch between the TBC and bond coat. Accordingly, expansion of elements in a thermal barrier coating system with a roughened bond coat does not lend to separation and de-bonding therebetween. An effect of the roughened bond coat includes an enhanced life of the TBC in the thermal barrier coating system.

In the following description, material compositions of mixtures are provided in weight percent unless otherwise expressed. Further, individual compositions are provided in weight percent, unless otherwise provided. For example, if a mixture comprises about 70% of Constituent A and about 30% of constituent B, the percents are in weight percents. Nomenclature used for compositions is as follows. If Composition A comprises Ni-23Cr-6Al-0.4Y, yttrium is provided at 0.4 weight percent, aluminum is provided at 6 weight percent, chromium is provided at 23 weight percent, and nickel is provided as the balance weight percent.

Figure 1:
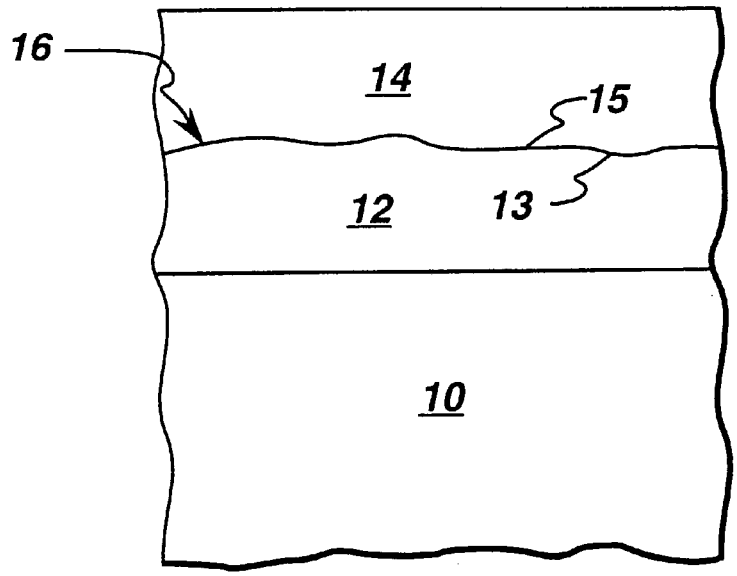
FIG. 1 is a schematic representation of a known thermal barrier coating system.
Figure 2:
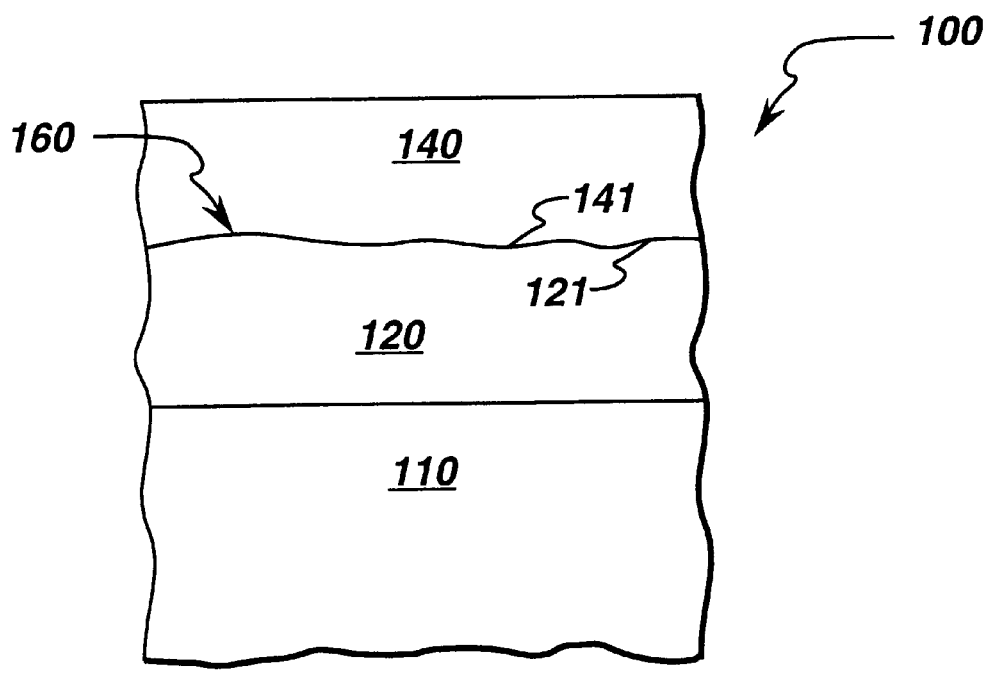
FIG. 2 is a schematic representation of a thermal barrier coating system including a roughened bond coat.

A thermal barrier coating system 100, including a dense roughened bond coat, as embodied by the invention, is schematically illustrated in FIG. 2. The thermal barrier coating system 100 comprises a substrate 110, a dense roughened bond coat 120 and a TBC 140. An interfacial surface area 160 is located at adjacent, adjoining surfaces 121 and 141 of the roughened bond coat 120 and the TBC 140, respectively. The density of the bond coat 120 is at least about 95% of its theoretical density.

The substrate 110 comprises an element to be thermally insulated by the thermal barrier coating system 100. For example, the substrate 110 comprises a component such as a turbine component, turbine airfoil blade, bucket, vane, and nozzle (hereinafter "turbine component"). If the substrate 110 comprises a turbine component, an appropriate substrate material includes one of a nickel-based superalloy material, an iron-based superalloy material, a nickel-iron-based superalloy material, and a cobalt-based superalloy material. The following description refers to a nickel-based superalloy material, however this material is merely exemplary of substrate materials, and is not meant to limit the invention in any way. Other substrate materials are within the scope of the invention.

The TBC 140 comprises appropriate materials that provide thermal insulation. For example, but in no way limiting of the invention, the TBC 140 comprises zirconia, such as at least one of a stabilized zirconia and a partially stabilized zirconia (PSZ).

The roughened bond coat 120 is disposed on the substrate 110 by a thermal spray process, such as, but not limited to, high-velocity oxygen fuel (HVOF) thermal spray process. The roughened bond coat 120 comprises a layer formed from a HVOF by a metal powder mixture that is fed to a HVOF spray gun. The metal powder mixture is deposited to form a dense bond coat 120 that possesses an uneven, irregular and undulated surface. While HVOF thermal spray processes and associated apparatus are known, and rough bond coats can be produced using coarse metal powders, these bond coats typically contain low density, for example less than about 90%, due to un-melted powders.

The roughness of the bond coat 120 is sufficient to increase interfacial surface areas at the interface, thus reducing de-bonding and increasing accommodation of thermal expansion mismatches. The bond coat 120, as embodied by the invention, possesses a roughness in a range of about 100 microinches (about $2.5\times10^{-4}$ cm) Ra (Arithmetic Average Roughness (Ra) as determined from ANSI/ASME Standard B461-1985) to about 2000 microinches (about $5.0\times10^{-3}$ cm) Ra. Alternatively, the bond coat 120 possesses a roughness in a range of about 100 microinches (about $2.5\times10^{-4}$ cm) Ra to about 400 microinches (about $1.0\times10^{-3}$ cm) Ra. Further, the bond coat 120 possesses a roughness in a range of about 100 microinches (about $2.5\times10^{-4}$ cm) Ra to about 300 microinches Ra ($7.5\times10^{-4}$ cm).

A HVOF thermal spray process produces a dense metallic coating with desirable physical properties. The desirable physical properties include wear resistance, corrosion resistance, low oxide content, low stress, low porosity, and high bonding strength to a base metal (substrate), for example often equal to or greater than 12,00 psi.

HVOF thermal spray processes use a mixture of fuel and oxygen provided at an oxygen to fuel (O/F) ratio. The fuel comprises at least one of propane, propylene, hydrogen, and kerosene. The fuel and oxygen mixture is provided to a combustion chamber in a HVOF spray gun. The fuel and oxygen mix in a front portion of the HVOF spray gun. When the fuel and oxygen are thoroughly mixed, they are ejected from the HVOF spray gun and ignited. The metal powder mixture, which forms the roughened bond coat, is fed into the HVOF gun using a carrier gas, such as argon. The metal powder mixture comprises a metal powder mixture, which is mixed with the ignited ejected fuel gases to melt the metal powder mixture. The melted metal powder mixture forms a metal powder spray. The HVOF spray gun propels the metal powder spray at high speeds, such as in a range from about 3,000 ft/sec to about 7,000 ft/sec (about 900 m/sec to about 2200 m/sec) towards the substrate to be coated. The high speed of the metal spray produces a dense metallic coating on the substrate.

The O/F ratio is variable for the HVOF thermal spray processes, in accordance with factors such as, but not limited to, an intended thickness of the HVOF coating, a HVOF spray gun type, a desired roughness of the bond coat, a material applied by the HVOF gun, temperatures generated by the fuel in the HVOF spray gun, fuel, HVOF metal powder mixture material characteristics, and other related factors. The exact O/F ratio is selected considering all such factors, and may be varied during a HVOF thermal spray process, if desired.

The metal powder mixture for the HVOF thermal spray process, as embodied by the invention, comprises at least one of a first powder having first melting point (low melting-point powder) and a second powder having a second melting point that is higher than the first powder's melting point (high melting point powder). For example, but in no way limiting of the invention, the metal powder spray mixture comprises at least one of Ni-60Al-1B and Al-11.6Si as the low melting point powder, and at least one of MCrAlY, there M is at least one of nickel, iron, and cobalt, and Ni-20Cr as the high melting point powder. The specification refers to NiCrAlY; however, this is merely exemplary of MCrAlY within the scope of the invention. The combination of first and second melting point powders results in a higher density by more of the powders melting in the HVOF process as compared to HVOF spray process using a single, typically high, melting point powder.

Ni-60Al-1B has a melting point at about 850° C. and Al-11.6Si has a melting point at about 577° C. As high-melting point powders, NiCrAlY has a melting point at about 1350° C. and Ni-20Cr has a melting point at about 1400° C.

NiCrAlY, Ni-60Al-1B, Al-11.6Si, and Ni-20Cr provide oxidation resistance for the bond coat 120 and thermal barrier coating system 100. Oxidation resistance is a desirable characteristic of a thermal barrier coating system, as it prevents undesirable spalling of the thermal barrier coating system. Spalling leads to de-bonding and separation of the thermal barrier coating system elements.

HVOF thermal spray process conditions, such as, but not limited to, an O/F ratio, a type of gas, a temperature of the flame, and an exit velocity, are varied to alter an amount of melted metal powder mixture present in the HVOF spray. The amount of metal powder mixture present in the HVOF spray alters the amount of deposited roughened bond coat and its thickness. The thickness of the roughened bond coat 120 is provided in a range from about $10^{-2}$ cm to about $3 \times 10^{-2}$ cm.

An exemplary metal powder mixture, for a roughened bond coat, "Mixture A", comprises about 10% Al-11.6Si and about 90% Ni-20Cr. A second exemplary metal powder mixture, "Mixture B," comprises about 15% Al-11.6Si and about 85% Ni-20Cr. Another metal powder mixture, "Mixture C," comprises about 25% Al-11.6Si and about 75% Ni-20Cr. These metal powder mixtures correspond to Al-11.6Si volume fractions of about 26%, about 37%, and about 52%, respectively.

Metal powder mixtures are provided in various forms, dependent on, and in no way limiting the invention, HVOF thermal spray process characteristics. For example, the metal powder mixture comprises −140+325 mesh powder, for Al-11.6Si, and −270+325 mesh powder, for Ni-20Cr.

Roughened bond coats, as embodied by the invention, are produced by HVOF thermal spray processes with O/F ratios in a range from about 0.25 to about 3.0. For example, exemplary O/F ratios that produce roughened bond coats using propylene are in a range from about 2.5 to about 3.0, for example about 2.6 and 3.0. If the fuel comprises hydrogen, the O/F ratio is in a range from about 0.25 to about 0.3. Other O/F ratios are within the scope of the invention. For propylene, a HVOF gun's flame temperature is provided at a higher temperature for the 3.0 O/F ratio, compared to the 2.6 O/F ratio, due to the higher oxygen content. The O/F ratio is chosen with respect to powder sizes and volume fraction of the low-melt and high-melt materials. Full fusing of the powders is desired for the low-melt powder to provide good adherence of the deposit to the substrate. Minimal melting of the high-melt powder is desired to provide the roughening of the surface while having it adhere to the substrate.

Figure 3:
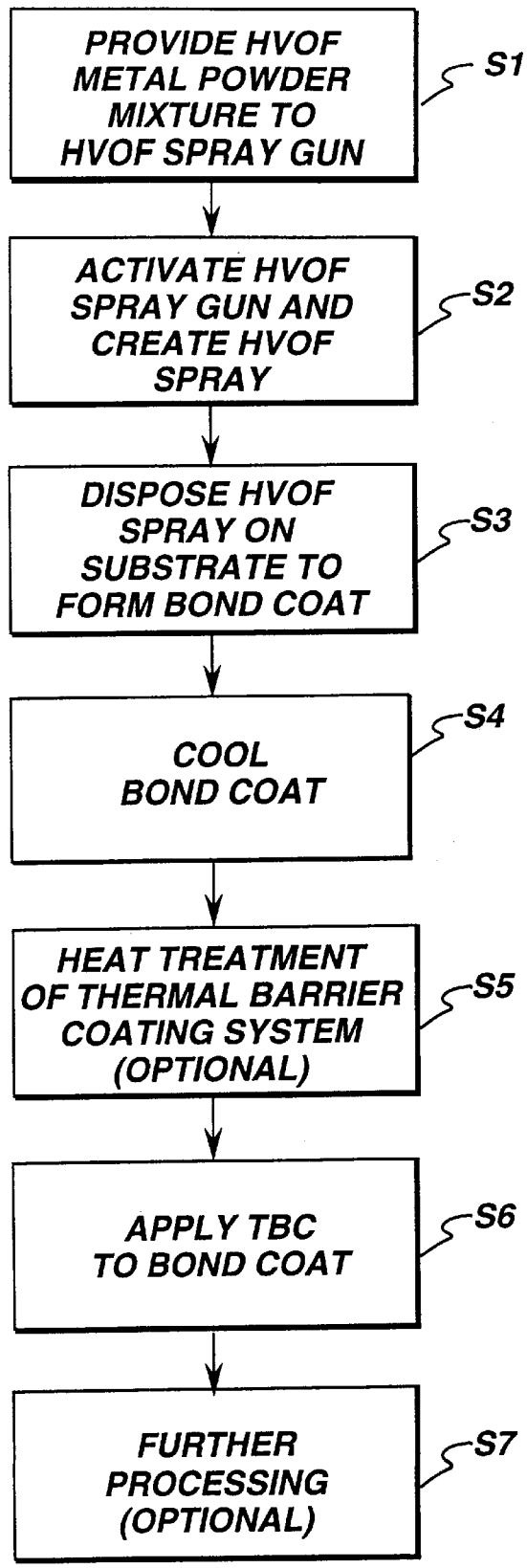
FIG. 3 is a flow chart of one method for forming a thermal barrier coating system.

FIG. 3 is a flow chart for a process of providing a roughened bond coat on a substrate. In step S1, a metal powder mixture is provided to a HVOF spray gun. In step S2, the HVOF gun is activated and forms a HVOF spray comprising the metal powder mixture. The HVOF spray is deposited on a substrate in step S3. The deposited HVOF spray forms a bond coat on the substrate. In step S4, the bond coat cools, for example to solidify the melted HVOF metal powder mixture.

After deposition the bond coat onto the substrate, the thermal barrier coating system may then undergo heat treatment in step S5. For example, the heat treatment comprises heat treating the thermal barrier coating system at temperatures in a range from about 760° C. to about 1200° C. A TBC is disposed onto the bond coat in step S6. The TBC together with the bond coat and substrate form a thermal barrier coating system.

The optional heat treatment of the thermal barrier coating system 100 is conducted at a temperature high enough to melt the low melting-point powder, such as at least one of Ni-60Al-1B and Al-11.6Si. This heat treatment temperature is such the high-melting point powder, such as at least one of Ni-20Cr and NiCrAlY does not undergo much (if any) melting. The re-solidification of the low melting-point powder interdiffuses (fuses) and joins the high-melting point powder and the melted low-melting point powder with each other. Also, the re-solidified low melting-point powder fuses the roughened bond coat 120 to each of the substrate 110. The TBC is applied after any heat treatments to fuse and re-act the low-melting point powders for better homogenization of the powders.

The thermal barrier coating system 100 can undergo further processing in step S7. The further processing reduces any undesirable porosity that may result from the HVOF thermal spray process. For example, the further processing comprises a hot isostatic press (HIP) process. This HIP process can be conducted at about 1200° C./4 hr/15 ksi, if done before TBC processing or if homogenized by heat treatment before a TBC is applied.

Figure 4:
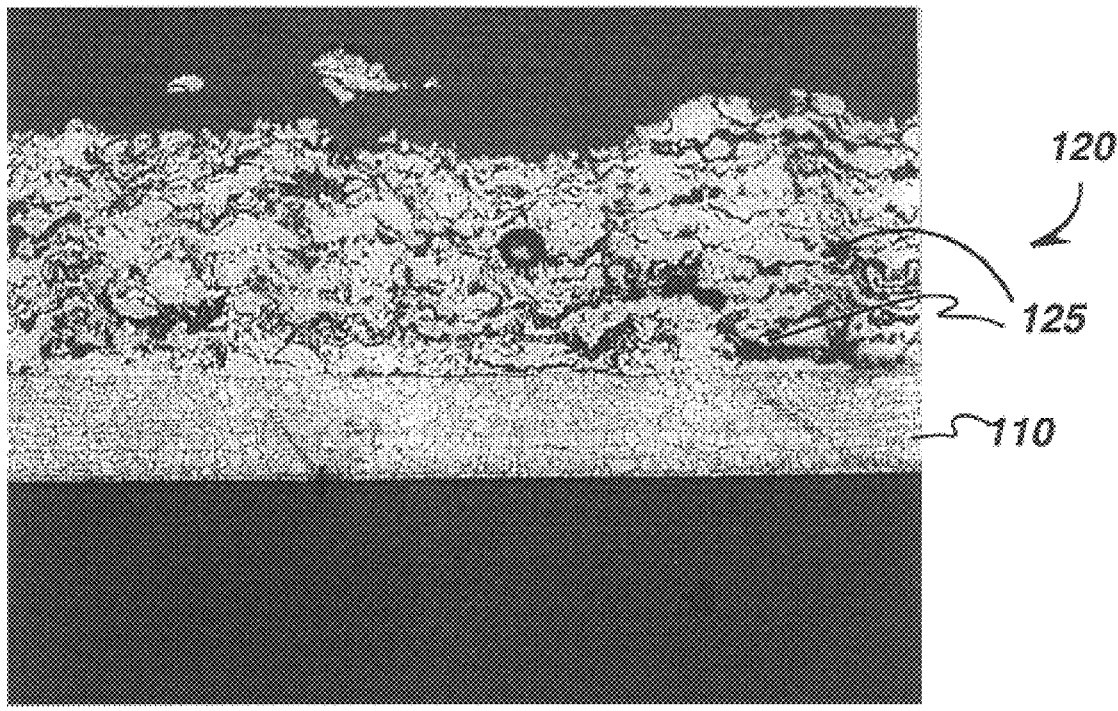
FIG. 4 is a micrograph of the roughened bond coat.
Figure 5:
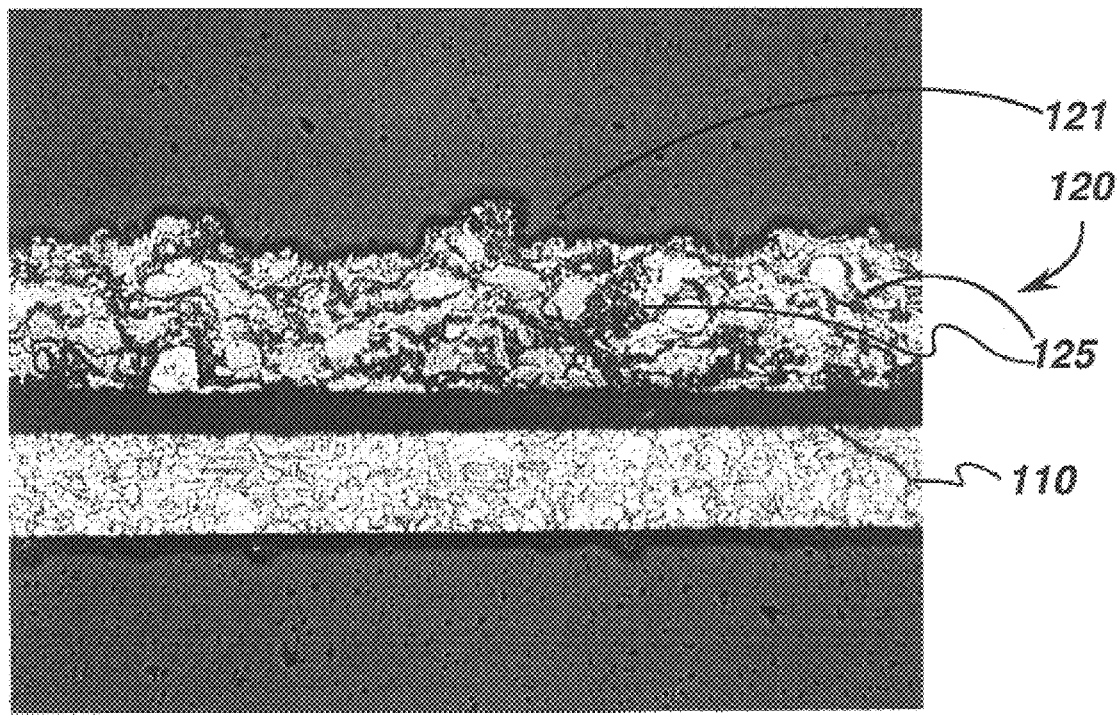
FIG. 5 is a micrograph of the roughened bond coat.

FIGS. 4 and 5 are microphotographs of exemplary roughened bond coats 120 on a substrate 110, as embodied by the invention. The bond coat of FIG. 4 is applied with O/F ratio of about 3.0. The roughened bond coat of FIG. 5 is applied with O/F ratio of about 2.6. The roughened bond coat of each microphotograph is formed of a HVOF metal powder mixture that comprises about 15% Al-11.6Si and about 85% Ni-20Cr. The dark regions 125 in the microphotographs are melted Al-11.6Si that have re-solidified. As illustrated by the microphotographs, the surfaces 121 of the bond coats 120 are uneven, undulated, and irregular.

The low melting-point powder in the HVOF metal powder mixture melts under HVOF thermal spray process conditions. Higher melting-point powders, such as NiCrAlY and Ni-20Cr powders, may not melt under HVOF thermal spray process conditions, when applied at spray temperatures associated with an O/F ratio of about 2.6, since these temperatures may be below the respective melting points. The non-melting of the high melting-point powders results in enhanced roughness of the bond coat (compared to a roughened bond coat with some melting), as the high melting-point powder is positioned on the uneven, undulated, and irregular surface 121 of the bond coat 120. The low melting point powder sufficiently melts to provide a density of at least about 95% of the theoretical density.

Both the low melting-point powders and the high melting-point powders undergo some melting under HVOF thermal spray conditions for temperatures associated with an O/F ratio of about 3.0 (FIG. 4). However, only some of the high melting-point powders melt at these temperatures. The uneven, undulated, and irregular surface of the bond coat produced by a HVOF thermal spray process at an O/F ratio of about 3.0 (FIG. 5) is rough, however, not as uneven, undulated, and irregular as the surface that results from an HVOF thermal spray process with O/F ratio of about 2.6.

HVOF sprayed roughened bond coats 120 exhibit limited porosity, as its density is at least about 95% its theoretical density. Porosity can be further reduced through heat treatment and further processing, as discussed above. Also, HVOF bond coats also exhibit microstructural inhomogeneity, such as, but not limited to, localized aluminum rich regions. Microstructural inhomogeneity is caused by the HVOF metal powders remaining un-melted, even after any optional heat treatments. Some localized aluminum rich regions are desirable in bond coats and thermal barrier coating systems as they serve as aluminum sources, which replenish aluminum regions that are depleted through oxidation.

While various embodiments are described herein, it will be appreciated from the specification that various combinations of elements, variations or improvements therein may be made by those skilled in the art, and are within the scope of the invention.

What is claimed is:

1. A bond coat comprising:
   a layer possessing an uneven, undulated, and irregular surface, the layer formed of a metal powder mixture disposed on a substrate by a thermal spraying process, wherein the metal powder mixture comprises a first powder having a first melting point and a second powder having a second melting point that is higher than the first melting point, and a density of the bond coat is at least about 95% its theoretical density and the metal powder mixture that forms the bond coat layer comprises at least one of Ni-60Al-1B and Al-11.6Si as the first powder, and at least one of Ni-20Cr and MCrAlY-20Cr as the second powder, where M is at least one of nickel, iron and cobalt.

2. A bond coat according to claim 1, wherein the first powder is provided in a range from about 10% weight percent to about 25% weight percent of the metal powder mixture and the second powder in a range from about 75% weight percent to about 90% weight percent of the metal powder mixture.

3. A bond coat according to claim 1, wherein Al-11.6Si comprises about 10% weight percent of the metal powder mixture and Ni-20Cr comprises about 90% weight percent of the metal powder mixture.

4. A bond coat according to claim 1, wherein Al-11.6Si comprises about 15% weight percent of the metal powder mixture and Ni-20Cr comprises about 85% weight percent of the metal powder mixture.

5. A bond coat according to claim 1, wherein Al-11.6Si comprises about 25% weight percent of the metal powder mixture and Ni-20Cr comprises about 75% weight percent of the metal powder mixture.

6. A bond coat according to claim 1, wherein the bond coat has a thickness of in a range from about $10^{-2}$ cm to about $3 \times 10^{-2}$ cm.

7. The bond coat according to claim 1, wherein the bond coat is disposed on a substrate, the substrate comprising a turbine component.

8. A bond coat according to claim 1, wherein the metal powder mixture that forms the uneven, undulated, and irregular surface with roughness in a range from about $2.5 \times 10^{-4}$ cm Ra to about $5.0 \times 10^{-3}$ cm Ra.

9. A bond coat according to claim 1, wherein the metal powder mixture that forms the uneven, undulated, and irregular surface with roughness in a range from about $2.5 \times 10^{-4}$ cm Ra to about $1.0 \times 10^{-3}$ cm Ra.

10. A bond coat according to claim 1, wherein the disposing the metal powder mixture forms the uneven, undulated, and irregular surface with roughness in a range from about $2.5 \times 10^{-4}$ cm Ra to about $7.5 \times 10^{-4}$ cm Ra.

11. The bond coat according to claim 1, where the thermal spraying process comprises high velocity oxygen fuel spraying.

12. A thermal barrier coating system comprising:
    a roughened bond coat disposed on a substrate; and
    a thermal barrier coating disposed on the roughened bond coat, wherein the roughened bond coat comprises:
    a layer possessing an uneven, undulated, and irregular surface, the layer formed of a metal powder mixture disposed on a substrate by a thermal spraying process, wherein the metal powder mixture comprises a first powder having a first melting point and a second powder having a second melting point that is higher than the first melting point, and a density of the bond coat is at least about 95% its theoretical density and the metal powder mixture that forms the bond coat layer comprises at least one of Ni-60Al-1B and Al-11.6Si as the first powder, and at least one of Ni-20Cr and MCrAlY-20Cr as the second powder, where M is at least one of nickel, iron and cobalt.

13. A system according to claim 12, wherein the first powder is provided in a range from about 10% weight percent to about 25% weight percent of the metal powder mixture and the second powder in a range from about 75% weight percent to about 90% weight percent of the metal powder mixture.

14. A system according to claim 12, wherein Al-11.6Si comprises about 10% weight percent of the metal powder mixture and Ni-20Cr comprises about 90% weight percent of the metal powder mixture.

15. A system according to claim 12, wherein Al-11.6Si comprises about 15% weight percent of the metal powder mixture and Ni-20Cr comprises about 85% weight percent of the metal powder mixture.

16. A system according to claim 12, wherein Al-11.6Si comprises about 25% weight percent of the metal powder mixture and Ni-20Cr comprises about 75% weight percent of the metal powder mixture.

17. A system according to claim 12, wherein the bond coat has a thickness of in a range from about $10^{-2}$ cm to about $3 \times 10^{-2}$ cm.

18. A system according to claim 12, wherein the bond coat system undergoes heat treatment and a portion of the metal powder mixture melts and re-solidifies to join the roughened bond coat to the substrate prior to disposing the thermal barrier coating on the roughened bond coat.

19. A system according to claim 12, wherein the substrate comprises a turbine component.

20. A system according to claim 12, wherein the bond coat comprises the uneven, undulated, and irregular surface with roughness in a range from about $2.5 \times 10^{-4}$ cm Ra to about $5.0 \times 10^{-3}$ cm Ra.

21. A system according to claim 12, wherein the bond coat comprises the uneven, undulated, and irregular surface with roughness in a range from about $2.5 \times 10^{-4}$ cm Ra to about $1.0 \times 10^{-3}$ cm Ra.

22. A system according to claim 12, wherein the bond coat comprises the uneven, undulated, and irregular surface with roughness in a range from about $2.5 \times 10^{-4}$ cm Ra to about $7.5 \times 10^{-4}$ cm Ra.

23. A system according to claim 12, wherein the thermal spraying process comprises high velocity oxygen fuel spraying.

* * * * *